United States Patent [19]
Barclay et al.

[11] Patent Number: 5,994,265
[45] Date of Patent: Nov. 30, 1999

[54] SEED COATING COMPOSITION OF GYPSUM WITH MOLYBDENUM

[76] Inventors: Stu Barclay, P.O. Box 609, Caldwell, Id. 83606-0609; Mike R. Reed, 103 Main St., Gooding, Id. 83330; Bing-Rui Ni, P.O. Box 609, Caldwell, Id. 83606-0609

[21] Appl. No.: 09/044,695

[22] Filed: Mar. 18, 1998

[51] Int. Cl.$^6$ .......................... A01N 25/26; A01N 59/02; A01N 59/16; A01N 63/00
[52] U.S. Cl. .......................... 504/100; 504/101; 504/117; 504/119; 504/188; 71/6; 71/7; 71/8; 71/9; 71/10; 71/31; 71/64.01; 71/64.02; 71/64.07; 71/DIG. 1
[58] Field of Search ..................... 504/100, 101, 504/117, 119, 188; 71/6–10, 31, 64.01, 64.02, 64.07, DIG. 1

[56] References Cited

U.S. PATENT DOCUMENTS

| | | | |
|---|---|---|---|
| 3,698,133 | 10/1972 | Schreiber | 47/57.6 |
| 3,947,996 | 4/1976 | Watts | 47/57.6 |
| 4,249,343 | 2/1981 | Dannelly | 47/57.6 |
| 5,534,434 | 7/1996 | Coke | 435/240.54 |
| 5,549,729 | 8/1996 | Yamashita | 71/26 |
| 5,628,811 | 5/1997 | College et al. | 71/62 |

OTHER PUBLICATIONS

Ryding, W.W., "Effects of Molybdenum and Sulphur on flue–cured Tobacco seedlings," The Zimbabwe Journal of Agricultural Research, vol. 20 (1), pp. 85–90, 1982.

Scott, D. et al., "Sulphur, Phosphate, and Molybdenum coating of Legume Seed," New Zealand J. of Agricultural Research, vol. 21, pp. 643–649, 1978.

Gupta, Umesh C. and MacKay, D.C. (1968) "Crop Responses to Applied Molybdenum and Copper on Podzol Soils", *Canadian Journal of Soil Science*. vol. 48, 235–242.

Gupta, Umesh C. and Kunelius, H.T. (Apr. 1975) "Effects of Seed Inoculation Methods with Peat–Based *Rhizobium Meliloti* on Alfalfa", *Canadian Journal of Plant Science*. vol. 55, 555–563.

McGraw, Robert L. and Bailey, Wayne C., "Efficacy of Seed Caoting to Improve Seedling Survival", publisher unknown, publication date unknown.

*Primary Examiner*—John Pak
*Attorney, Agent, or Firm*—Ken J. Pedersen; Barbara S. Pedersen

[57] ABSTRACT

Embodiments of a coating composition and coating method for seeds are described, the coating including molybdenum and a sulfur-containing component and being for improving seed and seedling performance. The preferred molybdenum source is molybdenum trioxide, and the preferred sulfur source is gypsum. After planting, the seed coating provides protection for the seed during dry spells until moisture is received and seed growth is established. During the establishment period for legumes, the invented seed coating serves as a protective coat for the seed under adverse growing conditions, such as temperature and moisture extremes. Within a few days of emergence of legume seedlings, the invented coating stimulates and/or feeds the Rhizobium bacteria that is in place on the seed and speeds up formation of the Rhizobium, which fixes/feeds nitrogen to the plant. The coating and method may also include inoculation with Rhizobium, and, optionally, other nutrients, pesticides, or herbicides and a binder.

3 Claims, 3 Drawing Sheets

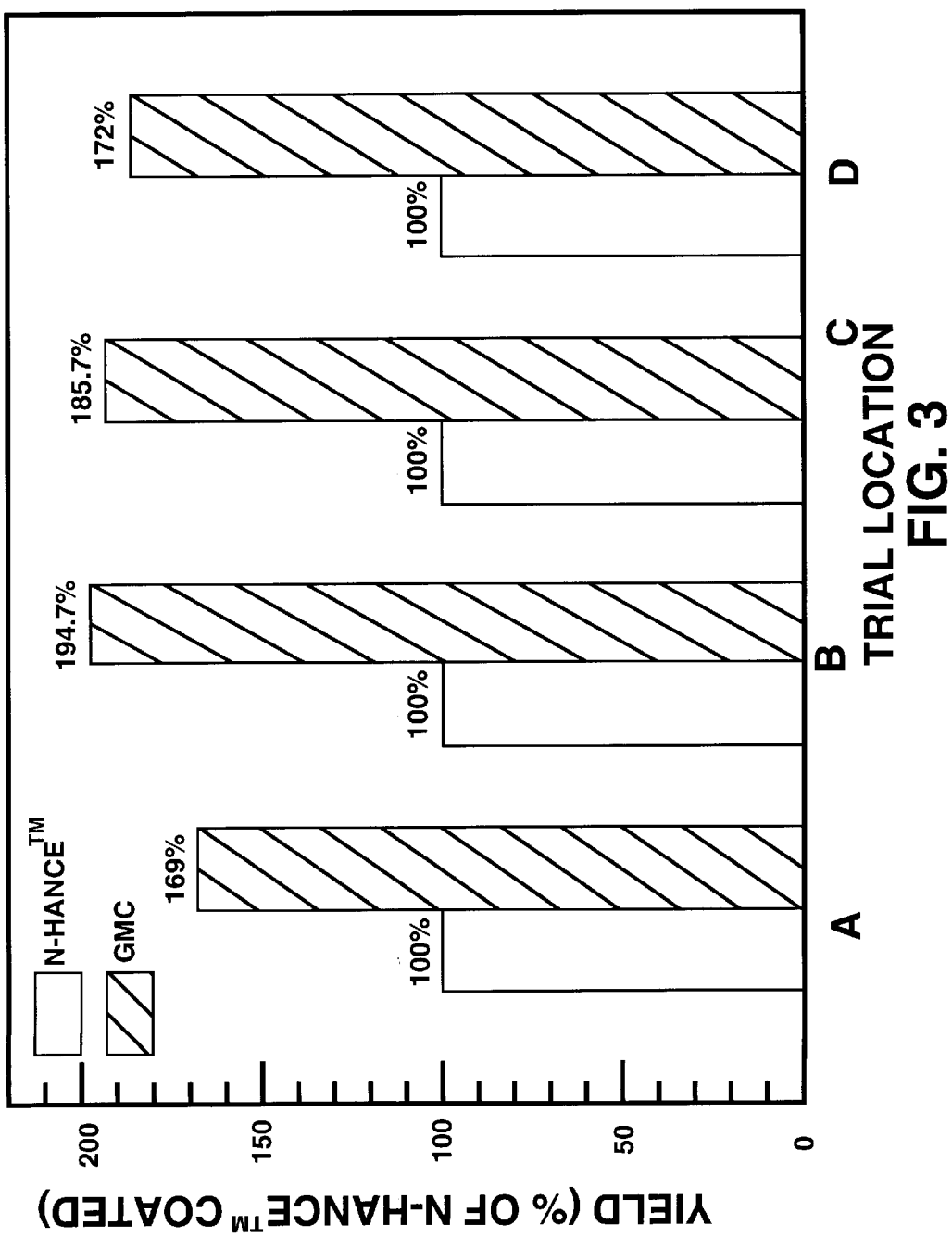

SEED COATING COMPOSITION OF GYPSUM WITH MOLYBDENUM

BACKGROUND OF THE INVENTION

1. Field of the Invention

This invention relates, in general, to increasing legume crop production by coating legume seeds with a protective and nutritive composition. More specifically, this invention relates to compositions and methods for a seed coating for legume seeds which protect seeds after planting and stimulate plant growth after emergence of the seedlings.

2. Related Art

Seed coatings have been used as means for protecting and enhancing the environment next to the natural seed coat, to control seed germination and/or improve seedling survival and growth rate. Toward these ends, coatings have been used as carriers for a variety of components: agrochemicals, Rhizobium bacteria, nutrients, beneficial elements, and plant growth regulators. Such components can be effective in improving seed germination and seedling survival and growth in the face of diseases, insects, low soil pH, and poor soil fertility. By including these components in seed coatings or pellets, the components are placed at the interface between seed and soil. This close proximity to the interface between seed and soil maximizes the effect of the components and reduces waste and environmental impact compared to the method of broadcasting such components over a field containing uncoated seeds.

Several seed coatings have been described in the patent literature that are intended for protective and/or nutritive purposes. For example, Schreiber (U.S. Pat. No. 3,698,133, issued Oct. 17, 1972) discloses the use of a multiple-layer coating, including an inner, porous, water-permeable coating and an outer polymer layer having a controlled permeability to water. The Schreiber coating is intended to control moisture permeation and delay germination until climatic conditions are satisfactory for continued crop growth. Watts (U.S. Pat. No. 3,947,996, issued Apr. 6, 1976) controls germination by coating seeds with a film-forming composition comprising a water-insoluble polymer and polyvinyl alcohol having an oxygen transmission high enough to maintain viability of the seed. Dannelly (U.S. Pat. No. 4,249,343, issued Feb. 10, 1981) discloses a temporary, disintegrating microgel coating for protecting seeds from mechanical and environmental damage and for carrying fertilizers, herbicides, or pesticides.

In other literature, molybdenum is shown to be a micronutrient for legumes. See, for example, Gupta and MacKay ("Crop Response To Applied Molybdenum and Copper on Podzol Soils", Can. J. Soil Sci., Vol. 48, 235–242 (1968)). Gupta and MacKay reports increases in yields of cauliflower, spinach, barley, timothy and alfalfa after application of Mo and Cu to the soils.

In acidic soils, lime coatings for seeds have been shown to be beneficial to seedling performance. The presence of the lime coating is believed to improve nodulation in soils with pH ranging from about 5.0–5.6. Kunelius and Gupta ("Effects of Seed Inoculation Methods with Peat-Based Rhizobium Meliloti On Alfalfa", Can. J. Plant Sci. 55: 555–563) discusses the performance of alfalfa seed inoculated with *Rhizobium meliloti* (with and without molybdenum-treating), compared to lime-coated alfalfa seed inoculated with *Rhizobium meliloti* (with and without molybdenum-treating). Kunelius and Gupta show superior results from the seeds with a lime coating, compared to those without the lime coating. Kunelius and Gupta report that treating with molybdenum did not always increase the alfalfa dry matter yields, the nitrogen content of the alfalfa tissue, or the nodulation of the alfalfa, compared with the results of corresponding seed treatments without added molybdenum. Thus, Kunelius and Gupta conclude that lime coating may be advantageous to vigorous alfalfa stands when broadcasting of limestone onto acidic soils is not practical or desirable.

Gypsum has been suggested as a seed coating. See, for example, McGraw and Bailey, "Efficacy Of Seed Coating To Improve Seedling Survival", a published industry report. In this article, gypsum is listed along with "clays, lime . . . phosphate rock, organic materials, etc.," as a possible seed coating.

Examples of other nutrients and additives for improving plant growth and/or crop production are described in several U.S. patents. Compositions for broadcasting and mixing with soils are described, as well as in vitro culture media. Coke (U.S. Pat. No. 5,534,434, issued Jul. 9, 1996), Yamashita (U.S. Pat. No. 5,549,729, issued Aug. 27, 1996), and College, et al. (U.S. Pat. No. 5,628,811, issued May 13, 1997) are examples of such nutrients and additives.

Coke discloses a basal nutrient medium for in vitro cultures of loblolly pines. The medium includes nitrate, ammonium, potassium, phosphorate, calcium, magnesium, sulfate, chlorine, sodium, borate, manganese, iron, zinc, copper, iodine, molybdenum oxide, cobalt, thiamine and EDTA. Coke discloses use of this medium, comprising many ingredients, for the purposes of asexual propagation, rejuvenation, virus elimination, and genetic transformation.

Yamashita discloses a composition for stimulating growth of plants comprising a long list of preferred ingredients: a carbon skeleton/energy component (typically a sugar or mixture of sugars such as molasses); a macro-nutrient component providing nitrogen, phosphorus, potassium and calcium and preferably also magnesium and sulfur; a micronutrient component providing zinc, iron and manganese, and preferably also copper, boron, molybdenum and cobalt; and preferably a vitamin/cofactor component, an enhancement component, and a buffer. Yamashita teaches that the most important nutrients are nitrogen, phosphorus, potassium and calcium, zinc, iron and manganese. Yamashita lists thiamine, riboflavin, nicotinic acid, pyridoxine, folic acid, biotin, pantothenic acid, cyanocobalamin, phosphatidylcholine, inositol, and para-minabenzoic acid as vitamin/cofactors. Yamashita lists as enhancement components such materials as complexing agents, gums, and growth regulators, including seaweed extract, citric acid, Katy-J complexing agent, and Xanthan gum. Yamashita discloses that the media may be applied in the form of an aqueous solution, sprayed at intervals at different stages of the plant growth, or in a form suitable for coating seeds or pollen.

College, et al. discloses a plant-growth enhancement method intended for ameliorating acid soils. In the College method, 0.05 to 20 percent by weight of flue gas desulfurization by-product is mixed into the soil. The flue gas desulfurization by-product consisted of 80–99 wt-% of gypsum and 1–20 wt-% of magnesium hydroxide.

Still, there is a need for improved compositions and methods of protecting and enhancing legume seeds and seedling survival and growth, in order to increase plant vigor and crop production. These is a need for economical and convenient compositions and methods for such seed treatments that can reliably improve seedling performance.

SUMMARY OF THE INVENTION

The present invention comprises a composition and method of improving legume seed and seedling performance. The invention comprises a composition of molybdenum in gypsum with a binder as a coating for legume seeds. Gypsum is preferred as a source of sulfur, however, other sources of sulfur may also be used.

After planting, the invented seed coating provides protection for the legume seed during dry spells until more moisture is received and seedling growth is established. During the establishment period for the legumes, the invented seed coating serves as a protective coat for the seed under adverse growing conditions, such as temperature and moisture extremes. Within a few days of emergence of the seedling, the invented coating can provide a favorable environmental condition for the Rhizobium bacteria for quick nodulation. The nodules thus formed fixes/feeds nitrogen to the plant.

The invented method of seed coating, besides providing the molybdenum, gypsum and binder components, may also include inoculation with Rhizobium, and, optionally, other nutrients, pesticides, fungicides, or herbicides. The preferred coating and method uses an economical and convenient composition of gypsum with polyvinyl alcohol as a binder and a molybdenum (Mo) component, with Rhizobium bacteria and Apron™ fungicide.

BRIEF DESCRIPTION OF THE DRAWINGS

FIG. 3 is a graphical depiction of the results from Tests III–VI.

DESCRIPTION OF THE PREFERRED EMBODIMENTS

Figure 1:
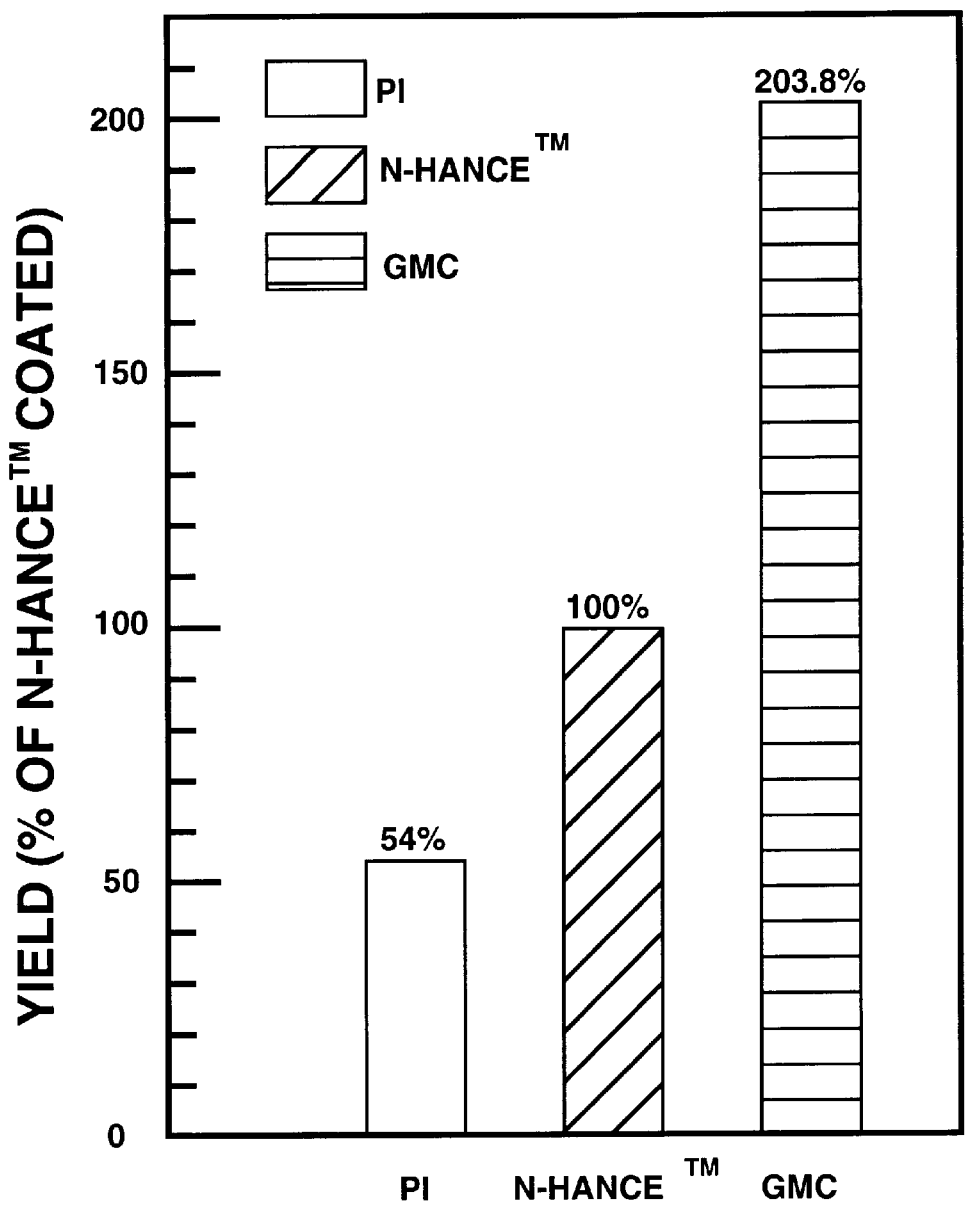
FIG. 1 is a graphical depiction of the results from Test I.

The term "seed coating" has been used broadly in seed industries to describe any process that adds materials to the seed. "Seed coating" often has been used as a broad term to include true seed coating, pelleting, and film coating. A significant number of agronomic, vegetable, and flower seeds are either coated, pelleted, or film coated today for diverse objectives.

Seed pelleting is the deposition of layers of inert materials to substantially increase seed weight and to improve seed plantability. The main application of seed pelleting is to pelletize small, light, variably-sized, or irregularly-shaped seeds, which are hard to singulate, into spherical or near spherical capsules for precision sowing. Instead of oversowing raw, uncoated seed and then subsequently thinning established plants, which can be very costly when seeds and labor are expensive, pelleted seeds can be precisely planted to achieve uniform spacing. Seed pelleting is mainly used in vegetable and flower seed sectors because of its high operational cost.

Film coating is the application of a continuous layer of polymer film over the seed coat to control product dust-off. It is also used for seed cosmetics and variety identification, for example, by color. Film coating is mainly applied on vegetable seeds, because the high cost of the film coating polymer does not justify its value on low cost seeds.

True seed coating may be defined as the addition of a layer of any material that would result in a significant weight gain and size increase, but the coated seed still retains the same shape as the raw. It is mainly employed to coat small-seeded forage legume and grass seeds. The main purpose of a seed coating is to improve seed plantability and to incorporate seed treatment chemicals, nutrients, and beneficial elements into the coating to meet seedlings' early needs. Moreover, it has been proven to be the most efficient way of inoculating small-seeded forage legume seeds.

The conventional, current coating process for forage legume seeds employs limestone coating and Rhizobium to inoculate the seeds. At the same time, metalaxyl, a systemic fungicide specially for the control of systemic downy mildews, pythium, and Phytophthora spp. is also incorporated in the coating. Nutrient elements, such as N, P, K, Fe, Zn, Mn, Mo, and B, may also be included. The inclusion of micronutrients, such as molybdenum and boron, is normally done under special customer request based on their soil analysis.

The current conventional coating process for grass seed, on the other hand, is aimed at increasing seed size and weight and incorporating nutrients into seed coatings so they are immediately available to the young seedlings. Nutrients routinely included in commercial grass seed coatings are N, P, K, S, Fe, and Zn.

Unlike pelleting and film coating, seed coating is usually done on an industrial scale, due to its complex technology and heavy investment in the required machinery and facilities. Because large volumes of seed must be coated in a short period of time, a line process with great through-put is required for a coating facility.

The conventional seed coating percentage is about 33 wt-% (seed:lime ratio=1:0.5) for small-seeded legume seeds and about 50 wt % (seed:lime ratio=1:1) for grass seeds. Unlike pelleting, which builds up the seeds consecutively with alternating applications of adhesive and filler materials, seed coating typically applies all the ingredients onto the seed in one step. Normally, all the adhesive required for the desired buildup is thoroughly mixed with the seeds, colorant, fungicide or pesticide, Rhizobium innoculant, and other ingredients first. Then, all the mineral material, such as limestone, is added and mixed. Considerable skill is required for this process because not only the property and the concentration of the adhesive is important, but the balance between the amount of adhesive and limestone will also affect the quality of the coating. While too much adhesive will result in lumps, inadequate adhesive will result in dust-off, low durability of the coating, and low buildup. The biggest dilemma is that the trial and error method required to reach the right formula is very expensive, because large quantities of seeds are needed to run each trial.

Coating materials, including both the adhesives (also known as binders, glues, or stickers) and the mineral material, are selected for beneficial adhesive and molding properties that: will not cause seed doubling during the coating process; will have good durability to prevent dust-off during handling, transportation, and sowing; and, more importantly, will have no adverse effect on seed germination. While limestone coating is a well-known process, special attention should be paid to the selection of the adhesive. A good adhesive should not impair seed germination, should give the seeds a durable coating when the seeds are dry, and must be readily soluble in water so that the coating will not stick on the seed coat when the seeds are wet.

The preferred, but not the only, embodiment of the instant invention comprises a coating for legume seeds applied prior to planting, for inoculated seedling survival and seedling growth. The "coating" of the present invention includes coating, pelleting and film coating according to the above description. The preferred composition of the coating is a mixture of gypsum with a binder and a molybdenum (Mo) component, with preferred, but optional, inoculation with Rhizobium bacteria and pesticides. The preferred coating is about 30 wt-% of the coated seed weight, and the coating is preferably about 94.4 wt-% gypsum, about 2 wt-% binder, about 0.8 wt-% molybdenum (Mo), about 2.7 wt-% Rhizobium and about 0.3 wt-% Apron™ fungicide.

The preferred seed coating process uses conventional technology that surrounds a seed piece with a solid matrix or "coating". This coating, according to this invention, is usually comprised of the following:

1. Finely ground mineral material is used as a base. For the purposes of this invention, gypsum (calcium sulfate) is employed as a source of sulfur. Other minerals, such as calcium sulfide and/or calcium sulfite may also be employed as sulfur sources or a sulfur component. The sulfur source base mineral may be mixed with other conventional mineral or solid matrix materials, like, for example, lime, alumina, starch, diatomaceous earth, clay, oyster shell, etc. Such mixing should decrease, but not eliminate, the beneficial effect of the sulfur component.

2. Beneficial additives for seedling survival and vigor may be included. Among these beneficial additives are Rhizobium innoculant, a bacteria which nodulates legume crops for efficient nitrogen fixation, systemic fungicides or biologicals to protect a developing seedling, and nutrients for plant vigor. Various forms of sulfur may also be included. In this invention, a Mo component is also added.

3. The base material and additives are bound together to form a coating by a water-soluble adhesive, preferably polyvinyl alcohol. The amount of build-up on the seed can vary from 1 to 200 percent by weight of the original, uncoated seed, but the preferred range is 5–50 wt-%.

The Rhizobium innoculant, listed in #2 above, is a soil-borne bacteria which is beneficial to plants and/or genetically produced plants that accept Rhizobium innoculant to produce nodules to replace a need for nitrogen fertilization. In this invention, the bacteria invades the roots at specific, susceptible sites. There, the bacteria form colonies known as nodules. Rhizobium excrete soluble nitrogen, which is of great benefit to the plant. The molybdenum component, also referred to in #2 above, is believed to facilitate the transfer of nutrients by the nodules, including the sulfur from the sulfur source.

The process of seed coating is done in two phases, wet and dry. In the wet phase of coating, liquid adhesive is first introduced to the seed in sufficient quantity to adhere to the seed an amount of solid that is up to twice the weight of the seed. After mixing the adhesive and seed, finely ground base mineral and additives including the Mo component are introduced to the mixture, and the resulting mixture is then fed to the processing line to compact the seed and to start the dry phase. The wet mixture is rolled within an inclined drum, to compact the coating on the seed. At this point, the seed and coating must be immediately dried, before too much moisture is imbibed by the seed, which would cause pregermination, and would ruin the seed. A large, fluid bed drier is utilized in this step, especially designed to rapidly draw off moisture without using excessive heat which can kill the seed, as well as beneficial Rhizobium bacteria. The dried seed is then screened and bagged for shipment and sales.

The principal source of molybdenum used in the invented formulation is molybdenum trioxide ($MoO_3$). This Mo form of the Mo component has been chosen for two reasons:

1. Molybdenum trioxide is a form of molybdenum that is least toxic to Rhizobium; and
2. Molybdenum trioxide tends to release molybdenum slowly, spreading its benefit over a longer period of time.

Other forms of molybdenum may also be used. Sodium molybdate is an alternative Mo source to be used in situations when Rhizobium survival is not an issue. Potassium molybdate is also effective, and is not toxic to Rhizobium.

Gypsum (calcium sulfate) is the preferred source of sulfur used in the invented formulation. Gypsum allows for a slow release of sulfur, and the calcium component supplies a buffering benefit, which is believed to further enable the beneficial effect of the invention. Other sources of sulfur may also be used, in solid, liquid, and gaseous forms. Elemental sulfur may be mixed with dry material, or ammonium sulfate or uremic sulfate may be applied to the formula, for example.

Although other nutrients, herbicides, pesticides, binders, or layers thereof may be added to the invented coating, it is anticipated that an economical and effective coating will consist of a single, substantially homogeneous layer of gypsum, Rhizobium, molybdenum component, fungicides (e.g., metalaxyl, Thiram™, etc.), nutrients (N, P, Fe, S, Zn, Mn, B, etc.), and adhesive or binder (polyvinyl alcohol, polyvinyl acetate, arabic gums, polyvinyl pyrrolidone, etc.). Specifically, these ingredients are preferably in the following ranges of wt % of coating:

| | |
|---|---|
| Gypsum | 1–98, preferably 50–98 |
| Rhizobium | 0.5–4.5 |
| Molybdenum Component | 0.1–15, preferably 0.5–5 |
| Fungicide | 0.05–2.0 |
| Binder | 0.5–3.5 |

Other biologicals, e.g., bactericides, herbicides, etc., or bio-stimulants, e.g., plant growth regulators, etc., may also be used.

Experimental Data

Tests were conducted to show the effect of the invented coating versus other coatings on seed survival and seedling and plant growth.

Test I

FIG. 1 shows the effect of three alfalfa seed treatments: "PI", which was alfalfa seed preinoculated with 2.7 wt-% Rhizobium only; "N-Hance™", which was seed coated with a coating comprising lime and 2.7 wt-% Rhizobium; and "GMC", which was seed coated with a coating according to the invention, comprising about 94 wt-% gypsum, 0.8 wt-% molybdenum, and 2.7 wt-% Rhizobium. The seeds were fall-seeded in soil with a pH of 7.6. The first cutting yield of matter for 50 alfalfa plants were measured, as shown in FIG. 1. The yield results from GMC-coated seeds were over twice those from N-Hance™-coated seeds, and almost four times those from the uncoated, but pre-inoculated ("PI") seeds.

Test II

Figure 2:
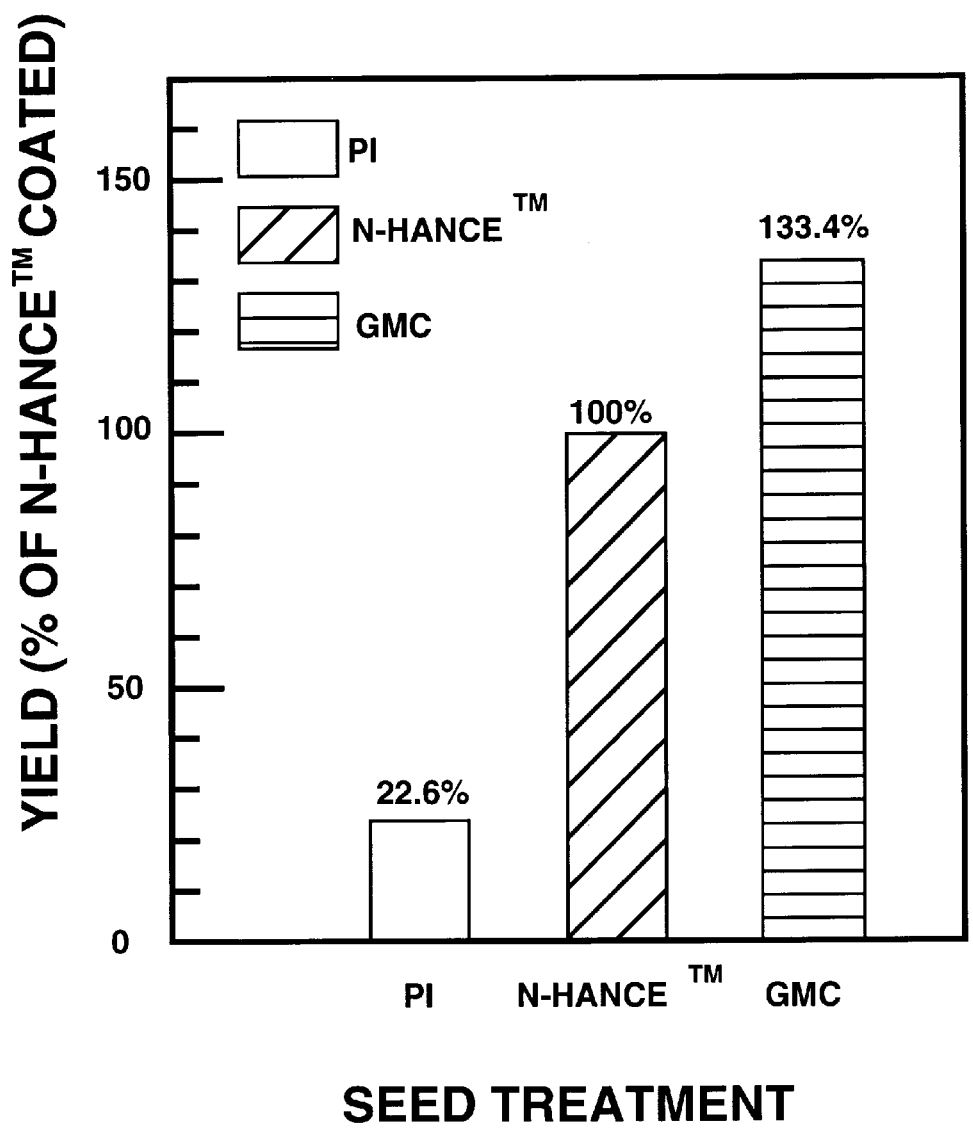
FIG. 2 is a graphical depiction of the results from Test II.

This test utilized the same three types of seeds as in Test I, and the results are shown in FIG. 2. The seeds were spring-planted in alkaline soil of pH 8.5. The GMC-coated seed produced more than 33% greater total plant growth than those of N-Hance™-coated seeds and nearly six times those of PI only seed.

Tests III–VI

Soil plots in four different locations were used to compare total air-dried plant weight of fall-seedings. The seeds were N-Hance™-coated seeds and GMC-coated seeds according to the invention. The four soils exhibited pH ranging from 7.1 to 7.6. The yields, shown in FIG. 3, resulting from GMC-coated seed were greater than those of the N-Hance™-coated seeds, ranging from 169% to 194.7% of the N-Hance™-seed yields.

In summary, the test data suggests that the preferred composition comprising gypsum and Mo in a seed coating is advantageous to seed and seedling performance, resulting in increased yields of alfalfa stand dry matter. The reaction of Rhizobium enhancement appeared to start in the tests at about three to four days after emergence of the plant, depending on soil temperature. After six to seven weeks after planting, both forage and roots showed increased growth of 20 to 30%.

It is believed that the combination of gypsum and Mo may act as both macro-nutrient and micro-nutrient, wherein the Ca and S of the gypsum may be soil conditioners and nutrients for plant growth, and the Mo may be a facilitator of nutrient-transfer by the Rhizobium nodules.

Although this invention has been described above with reference to particular means, materials and embodiments, it is to be understood that the invention is not limited to these disclosed particulars, but extends instead to all equivalents within the scope of the following claims.

I claim:

1. A seed coating composition consisting essentially of a molybdenum component, a sulfur component, and a binder component, wherein the molybdenum component is present at 0.5 to 5 wt. % of the composition and the sulfur component is present at 50 to 98 wt. % of the composition.

2. A coating as in claim 1, wherein the sulfur component is gypsum.

3. A seed coating composition consisting essentially of a molybdenum component, a sulfur component, a pesticide component, Rhizobium bacteria, and a binder component, wherein the molybdenum component is present at 0.5 to 5 wt. % of the composition and the sulfur component is present at 50 to 98 wt. % of the composition.

* * * * *